April 14, 1959

R. J. FOX ET AL 2,881,619

COAXIAL CONTROL ROD DRIVE MECHANISM FOR NEUTRONIC REACTORS

Filed April 23, 1957

INVENTORS
Richard J. Fox &
Lester C. Oakes

BY

ATTORNEY

April 14, 1959   R. J. FOX ET AL   2,881,619
COAXIAL CONTROL ROD DRIVE MECHANISM FOR NEUTRONIC REACTORS
Filed April 23, 1957   2 Sheets-Sheet 2

INVENTORS.
Richard J. Fox &
Lester C. Oakes
BY
ATTORNEY

United States Patent Office 2,881,619
Patented Apr. 14, 1959

2,881,619

COAXIAL CONTROL ROD DRIVE MECHANISM FOR NEUTRONIC REACTORS

Richard J. Fox and Lester C. Oakes, Knoxville, Tenn., assignors to the United States of America as represented by the United States Atomic Energy Commission Application April 23, 1957, Serial No. 654,626

1 Claim. (Cl. 74—25)

The present invention relates to driving mechanisms, and more especially to a novel control rod drive mechanism especially adapted to provide rigid and direct connection to a control rod when moving the same in and out of a channel in a neutronic reactor.

Control of the operating power level of neutronic reactors may be accomplished by inserting and withdrawing control rods within appropriate channels within the core or fuel lattice of the reactors. Movement of the control rods is generally accomplished through a drive mechanism coupling the control rod to a source of an electric control signal. It is common to provide a plurality of control rods for a single reactor, and each rod should be individually movable. In the past, electric motors have been coupled to conventional rack and pinion gear arrangements or to capstan-cable drives to convert the motor rotation into linear control rod movement. For various reasons it is often desirable to dispose control rods in adjacent channels in the reactor lattice, but the size of the required drive mechanism for moving the heavy rods heretofore was such that adjacent channels could not be used for control. A further disadvantage of the capstan arrangement is the slippage which occurs because there is no rigid connection between the drive and the control rod.

With a knowledge of the shortcomings of the conventional drive mechanism employed in reactor control, we have provided a novel small control rod drive mechanism which provides at all times a direct, rigid connection between the drive and the control rod, and which is of such a size and configuration that it may be mounted directly atop a reactor and used on adjacent channels. It is therefore, a primary object of our invention to provide a drive mechanism providing rigid connection between the drive and control rod which may be used in a relatively small space, so that control rods may be located in adjacent channels in a nuclear reactor. A further object of the invention is to provide a novel drive mechanism adapted to convert the rotary motion of an electric motor shaft into linear motion with a comparatively great reduction in speed to provide relatively slow linear movement suitable for control purposes. Yet another object of our invention is to provide suitable means for converting rotary motion at relatively high speed into linear motion at relatively low speed. These and other objects of our invention will become apparent from the following detailed description of a preferred embodiment thereof, when made in connection with the appended drawings, wherein:

In accordance with our invention a control rod is caused to move vertically through its channel in a reactor by energizing an electric motor. The motor is mounted coaxially in a housing disposed atop the control rod channel and includes a rotor which is provided with a hollow shaft having both straight and eccentric sections. The straight section is disposed concentrically around a drive shaft and serves to drive a novel gear train which in turn moves the drive shaft vertically. The drive shaft may be coupled to the control rod through a quick release mechanism such as a magnetic clutch and a shock absorber, as has now become conventional in the art.

Figure 1:
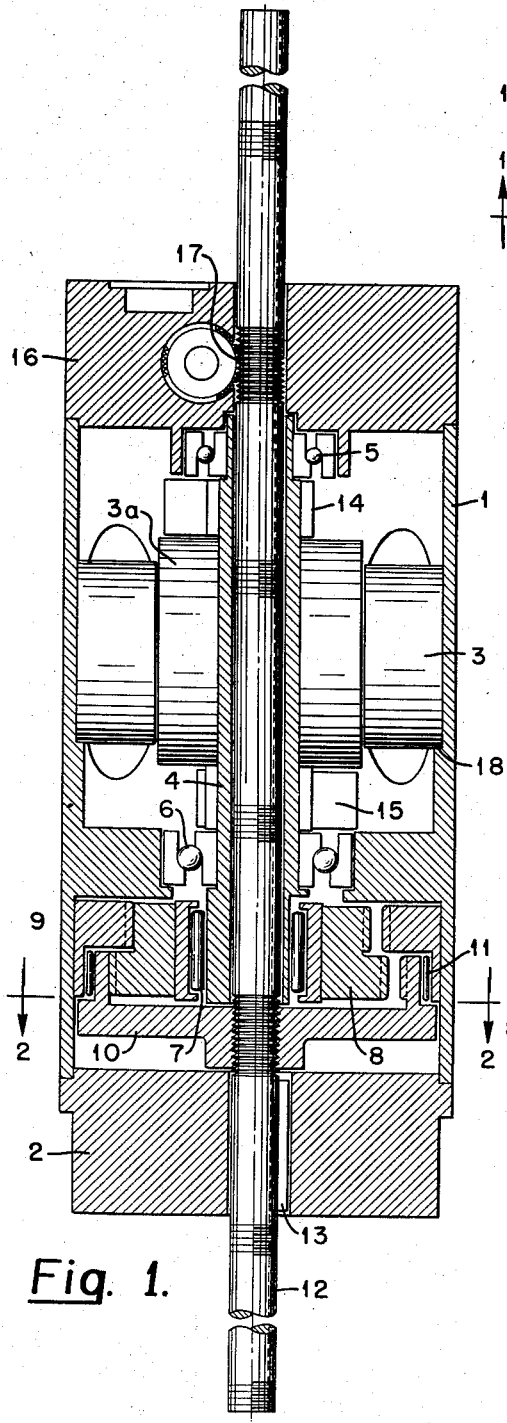
Figure 1 is a sectional view of our novel drive mechanism.
Figure 2:
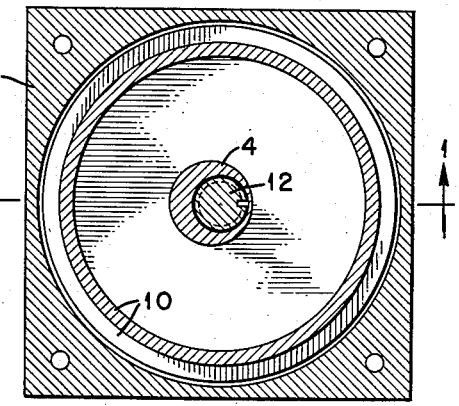
Figure 2 is another sectional view of the apparatus of Figure 1.
Figure 3:
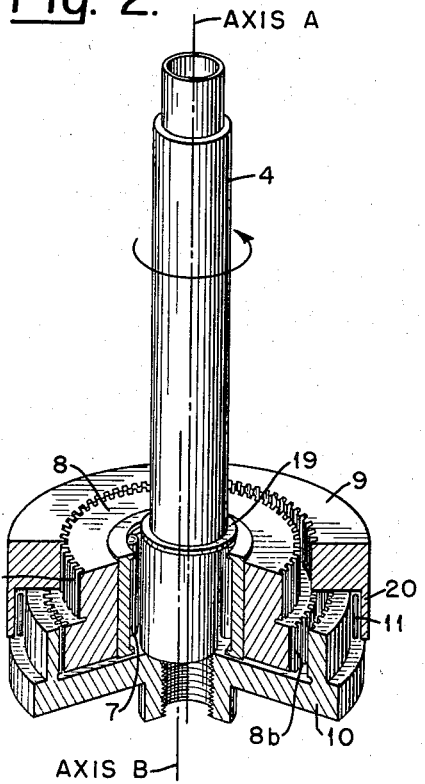
Figure 3 illustrates more clearly the novel gear reduction mechanism of our drive.

Referring now to Figures 1, 2 and 3, a drive screw 12, threaded along certain portions, is disposed along the axis of a stationary housing 1 and is slidably mounted therewithin. The housing is provided with a shoulder 18 which supports the housing of electric motor 3. An integral part of the motor rotor 3a is a hollow shaft 4, which has a straight section coaxial with the axis A and screw 12 and which is provided at its lower extremity with an eccentric section 19, having a central axis B. Shaft 4 is journaled in upper and lower bearings 5, 6, which may be combination thrust and radial single-row magneto type ball-bearings, for example.

Eccentric section 19 of shaft 4 drives needle-bearing 7, the outer bearing race of which is disposed concentrically about axis B and pressed into a central aperture in planetary gear 8. Gear 8 is provided with two radially and axially offset rows of teeth 8a, 8b. A stationary ring gear 9 is fixed to housing 1, while a movable ring-screw gear 10 is threaded to a correspondingly threaded portion of screw 12 and provided with an upstanding internal ring gear disposed to mesh with the lower row of teeth 8b. Needle-bearings 11 are provided between a flange 20 carried by fixed gear 9 and the outer smooth surface of the ring gear portion of gear 10. Housing 1 is closed at one end by centrally-apertured cap 2, which is recessed to receive key 13, carried by screw 12, to prevent the screw from rotating. Eccentric counter-weights 14, 15 are fixed to the shaft 4 to prevent any unbalance during high speed rotation of the shaft.

Figure 4:
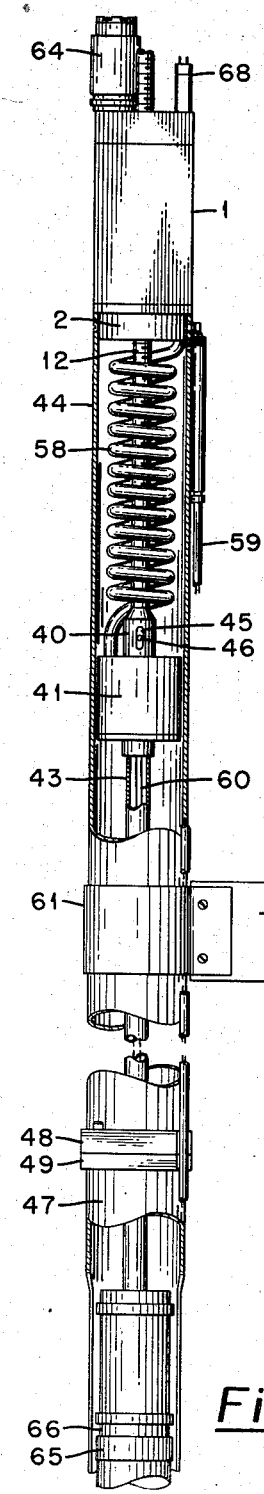
Figure 4 illustrates the upper portion of our novel drive assembly.

The upper end of housing 1 is closed by mounting cap 16 which may support a conventional synchro transmitter (Figure 4). Worm and wheel gearing 17 for coupling a threaded portion of screw 12 to the synchro drive shaft enables the synchro transmitter to display or transmit control rod position information.

Figure 5:
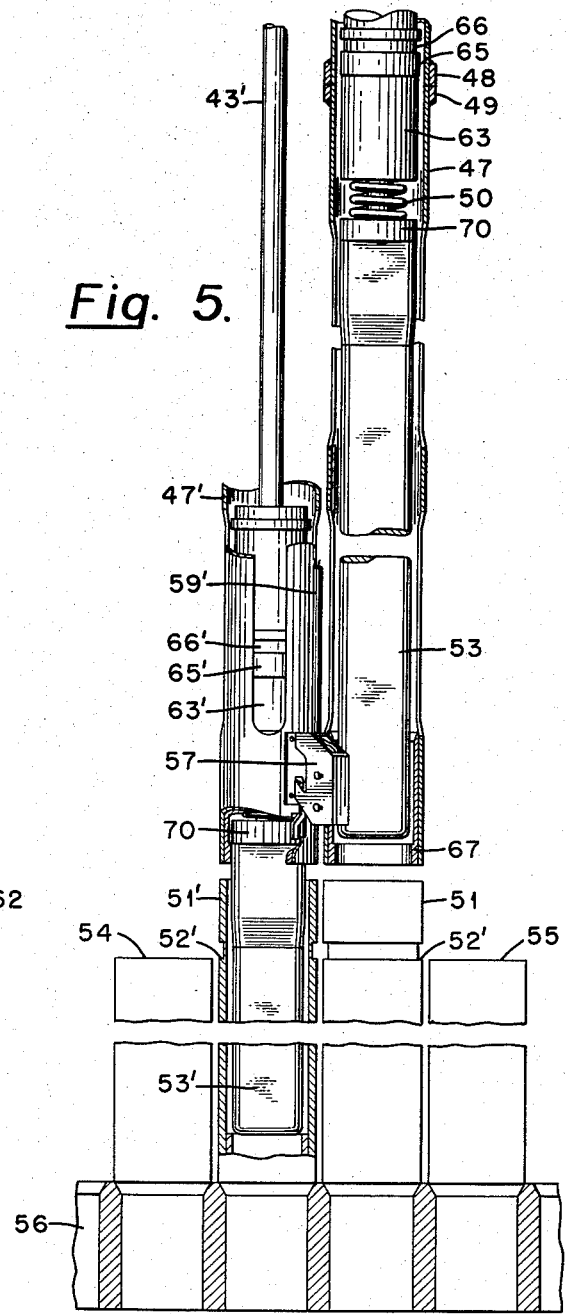
Figure 5 illustrates the lower portion of the apparatus of Figure 4 and a second drive assembly as connected to a control rod disposed in a neutronic reactor.

Referring now to Figures 4 and 5, the control rod drive may be disposed in a rectangular housing 1 atop the control rod channel in a suitable lattice type reactor. Several individual drive mechanisms may be mounted in closely adjacent channels because of the small size of the drives. Two adjacent assemblies are shown in Figure 5, with the upper section of one drive assembly being shown in Figure 4. The drive mechanism is coupled through its output screw 12 to an overtravel take-up device, which comprises a slotted adapter 40 provided with central wells at each end to receive screw 12 and lift tube 43, an elongated slot 45, and a pin 46 which extends through the lower end of shaft 12 and through slot 45. Tube 43 may be welded in place in adapter 40. Can 41 encloses terminal strips for receiving leads 60 from magnet 66, other leads not shown, and the ends of coiled cord 58. Cord 58 carries the several conductors to a terminal strip inside housing 1, whence leads may be taken to external terminal strip 68 and to appropriate external connections. Lift tube 43 terminates in magnet can 66, which carries the electromagnet for picking up armature 65. The armature is carried by shock absorber 63, which is in turn supoprted by spring 50. Absorber base plate 67 is provided with a generally oval aperture which stops downward motion of the shock absorber when cylindrical section 70 strikes but cannot pass through the slot.

Special control rod fuel element 51 may be provided with a necked-in portion at the top and is slotted to receive the control rod 53. Slotted tubular housing 47 is mounted atop the fuel element and provided with an upper flange 49. Mating flange 48 on the lower end of tubular housing 44 engages flange 49. End cap 2 is necked to rest in the upper end of housing 44. Control rod 53′ may extend into special fuel element 51′ in any convenient arrangement, such as that described in report ORNL–991, "The New Bulk Shielding Facility at Oak Ridge National Laboratory," available from the Office of Technical Services, Dept. of Commerce, for example. The specific reactor and/or control rod structure forms no part of this invention but is shown only for orientation purposes. A similar adjacent special fuel element 51 may receive control rod 53′, which is shown partly withdrawn. A plurality of standard fuel elements such as elements 54, 55 may be stacked in base 56 to form a reactor in the well known manner. Switch 57 may be mounted on housing 47′ and provided with an arm actuated by shock absorber 63′ to indicate that the control rod is seated. Leads from the switch may be taken through tube 59 alongside the housings and enter housing 1.

An electrical signal for magnet 66 may be derived from the reactor, brought to the drive on external leads, and coupled to the magnet through flexible cord 58 and leads 60. The entire drive and housing may be supported by bracket 61, which is fixed to a suitable support 62 above the reactor.

In operation of our novel drive, motor 3 is energized, causing shaft 4 to rotate counter-clockwise about vertical axis A. Vertical axis B through the center of section 19 will then move counter-clockwise about axis A, causing bearing 7 and associated gear 8 to be displaced radially outward by a force vector which rotates counter-clockwise about axis A. A portion of the upper row of teeth 8a mesh with the teeth on stationary ring gear 9, which is fixed to housing 1. The inner diameter of gear 9 is larger than the diameter of the upper row of teeth 8a, so that different sections of teeth 8a, progressing counter-clockwise, mesh successively as axis B rotates about axis A. Gear 9 has more teeth than row 8a, so that gear 8 will be caused to spin slowly clockwise about axis B while rotating counter-clockwise about axis A, thereby providing the first advantage in speed reduction to the gear system. Teeth 8b are rotated with gear 8. Portions of the internal teeth on ring gear 10 will mesh successively with teeth 8b, causing gear 10 to rotate clockwise about axis A at a speed determined by the difference in the numbers of teeth thereon. The internally threaded portion of the gear 10 receives a correspondingly threaded portion of drive screw 12, transmitting a linear movement to the screw 12 along axis A. Screw 12 will not rotate because it is restrained by a key 13 engaging end cap 2. Clockwise motion of gear 10 may cause the drive screw to move upward, for example. In like manner, by reversal of the direction of rotation on motor 3, screw 12 will be caused to move downward. The movement of gear 10 by the teeth 8b and the motion imparted to screw 12 through the internally threaded portion of gear 10 provide second and third gear reduction advantages to further reduce the speed of screw 12 compared with that of the motor 3.

One embodiment of the above described drive mechanism was 3 inches long, 3 inches wide and 7¼ inches high. The screw 12 and the corresponding portion of gear 10 were threaded with 9 threads per inch; the upstanding annular ring on gear 10 carried an internal gear having 64 teeth which meshed with the lower 58-tooth gear 8b; the upper row 8a contained 58 teeth and meshed with a 66-tooth internal ring gear 9; and the center of the eccentric surface (axis B) was offset .094 inch from axis A. Standard stub teeth having 20° pressure angle were employed. This drive lifted an 80 pound load at the rate of 12 inches of linear travel per minute, using a conventional four pole, A.C., 1/75 horsepower, 1750 r.p.m. electric motor. It will be apparent to those skilled in the art that the exact speed reduction obtained will depend upon the respective numbers of teeth provided on the gearing mechanism and the pitch of the threaded portions of the gear and screw; and may be varied to suit the application desired.

We claim:

Control rod drive mechanism for moving a control rod vertically into and out of a channel in a nuclear reactor and adapted for plural installation in vertical alignment with adjacent channels comprising a stationary elongated housing aligned over its corresponding channel; a push rod disposed within said housing and coupled to said control rod; a drive screw axially aligned with said push rod and at least partially contained in said housing; clutch means coupling said screw and push rod; an electric motor mounted in said housing concentrically about a portion of said screw and provided with a rotor, said rotor including an integral hollow shaft having a straight section concentric with said screw and a circular eccentric section; upper and lower bearings disposed about said straight section to journal said shaft; upper and lower eccentric counterweights carried by said straight section to balance the same during rotation; a circular needle bearing carried by said eccentric section; a circular planetary gear carried by said needle bearing and provided with upper and lower radially-offset rows of teeth; an internal ring gear fixed to said housing in horizontal alignment with and of larger diameter than said upper row of teeth; and a drive nut having an internally threaded portion for receiving said screw and an upstanding internal ring gear horizontally aligned with and of larger diameter than said lower row of teeth to translate the motion of said planetary gear into linear movement of said screw.

References Cited in the file of this patent

UNITED STATES PATENTS

| | | |
|---|---|---|
| 1,563,945 | Apple | Dec. 1, 1925 |
| 2,307,317 | Konig | Jan. 5, 1943 |
| 2,387,800 | Leland et al. | Oct. 30, 1945 |
| 2,410,695 | Werner | Nov. 5, 1946 |
| 2,418,351 | Jackson | Apr. 1, 1947 |
| 2,780,740 | Roman et al. | Feb. 5, 1957 |
| 2,792,036 | Buttke | May 14, 1957 |